2,750,293

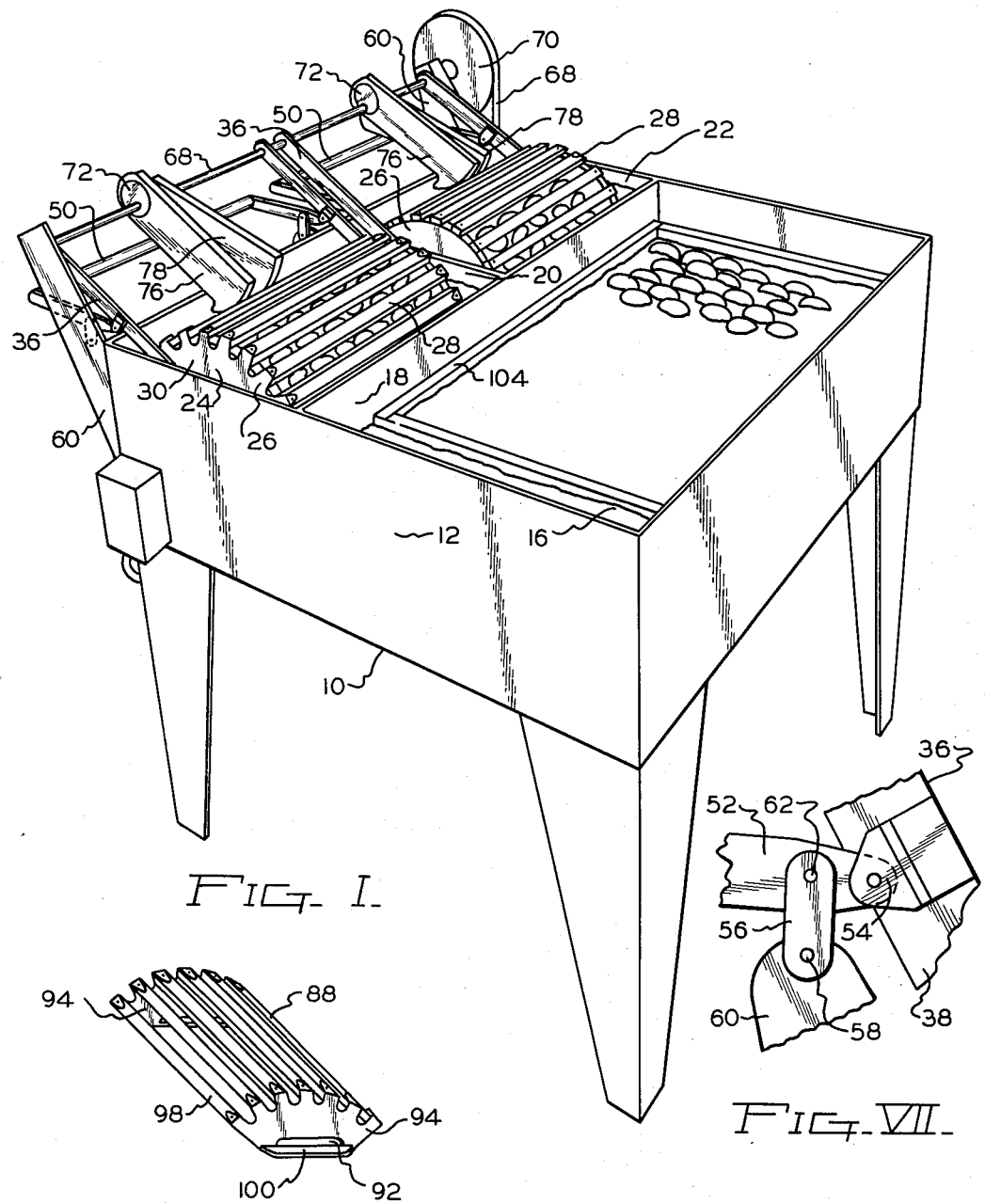

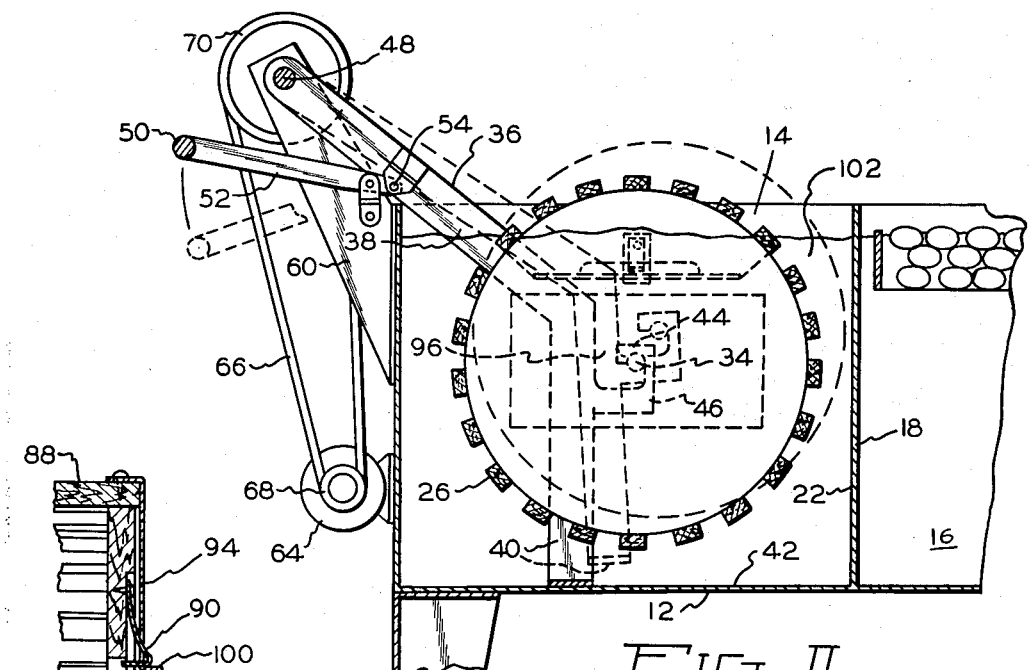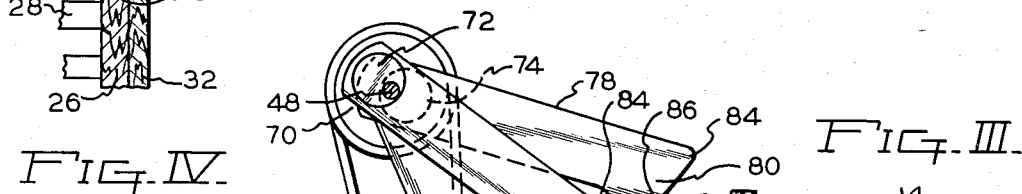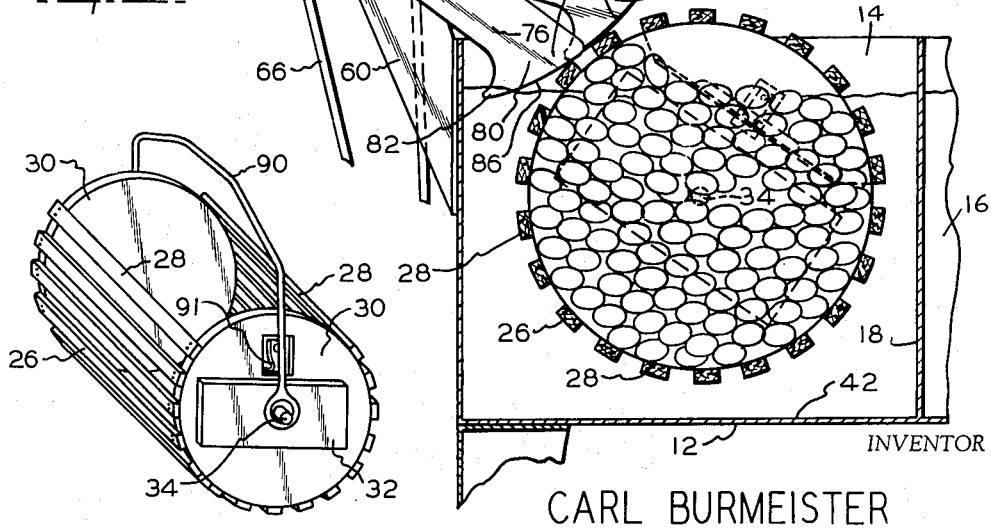

APPARATUS AND METHOD FOR WASHING EGGS

Carl Burmeister, Saline, Mich.

Application May 9, 1951, Serial No. 225,333

3 Claims. (Cl. 99—113)

The present invention relates to improvements in a method and apparatus for handling and washing eggs.

In the commercial production, washing, candling, grading and packing of eggs a substantial percentage of downgrading results from inefficient washing and cracked shells due to handling.

According to the present invention the handling of the eggs has been reduced substantially over present practices and, at the same time, a method of washing has been provided which produces a minimum of cracked shells yet thoroughly cleans the eggs in large quantities of all the common soils inherent in egg production under both cage and floor methods of handling the hens.

Thus, one of the objects of the invention is to provide an improved egg washing apparatus in which one of the elements of the apparatus is employed in gathering the eggs at the point of production.

Another object of the invention is to provide an egg washing apparatus in which the eggs are agitated in the washing solution within a perforated cylinder rotated with an intermittent motion.

Another object of the invention is to provide an improved egg gathering and washing container in the form of a slotted cylinder having closed ends carrying bearing pins for the rotation of the container in the washing apparatus and provided with an arcuate removable section for the loading and unloading of the eggs.

Another object is to provide an improved method of washing eggs in which the eggs, submerged in the washing solution, are subjected to intermittent elevation along an arc followed by and alternating with a settling of the eggs along the arc with an attendant agitation of the eggs in contact with each other during both elevation and settling.

A further object of the invention is to provide an egg washing apparatus in which means are provided for compensating for the number of eggs being washed in any one batch to provide uniform cleaning results with the cracking of the shells being substantially avoided.

A still further object is to provide an efficient, inexpensive, high-capacity egg washing apparatus in which the eggs are housed within a rotatable cylinder which is removable from the apparatus for loading and unloading the eggs yet is readily coupled to and uncoupled from its rotating mechanism.

These and other objects and advantages residing in the specific construction, combination of parts and detail of design for carrying out the aforesaid objects will more fully appear from a consideration of the following specification and the appended claims.

In the drawings, where only a single embodiment is shown for the purpose of illustrating the principles of the present invention, Fig. I is a perspective view of the improved egg washing apparatus, Fig. II is a section taken through one of the containers and associated structure adjacent the right hand end of the container in the right hand compartment of Fig. I, Fig. III is a sectional view taken adjacent the left hand end of the container in the left hand compartment of Fig. I, Fig. IV is a fragmentary cross-sectional view of a portion of the container showing the latch mechanism for the cover, Fig. V is a perspective view of the container equipped with bail to gather eggs, Fig. VI is a perspective view of the container cover, and Fig. VII is a detail of the toggle joint of the counterbalance mechanism.

Referring to the drawings, in the illustrated form the egg cleaning or washing apparatus 10 comprises a tank 12 divided into a washing section 14 and a rinsing section 16 by a partition 18. A partition 20 divides the washing section 14 into two compartments 22 and 24. The containers 26 in which the eggs are washed take the form of cylinders preferably fabricated from wood slats 28 attached at opposite ends to the wooden head 30. While it is possible to make the head 30 of sheet metal, or other structure, in practice I have found that an all-wood container 26 gives the desired buoyancy and provides a satisfactory exterior surface upon which the drivers operate to rotate the containers 26 with a step-by-step movement of what might also be referred to as a stop-and-go movement.

The heads 30 have externally reinforcing plates 32, preferably of wood, in which the trunnions 34 are carried on the longitudinal central axis of the containers 26. To support the containers 26 for rotation in the compartments 22 and 24, metal cradles 36 are provided in the form of angular end members 38 having foot portions 40 which may rest upon the bottom 42 of the tank 12 when the buoyancy of the containers 26 on the trunnions 34, exerted through the inverted bearings 44 of the arms 46, is insufficient to float the cradle 36 about the axis of the shaft 48.

Associated with each cradle 36 is a compensation mechanism in the form of a counter-balance 50 attached to arms 52 having pivotal connections at 54 with the members 38. Arms 56 have pivotal connections at 58 with fixed brackets 60 and at 62 with the arms 52 to provide toggle joints. As will be readily understood, the counter-balance 50 will tend to straighten out the toggle joint formed between the pivotal connections 54, 58 and 62 to rotate the members 38 about the axis of the shaft 48 in a counter-clockwise direction as viewed in Fig. II. This will increase the buoyancy of the cradle and container assemblies in the compartments 22 and 24 as the counter-balancers 50 move from the full line position of Fig. II toward the dotted line position shown, as will be hereinafter more fully explained.

For rotating the containers 26 in the bearings 44, the shaft 48 is driven either manually or may be rotated by a motor 64 through a belt 66 running over pulleys 68 and 70. Eccentrics 72 and 74 are affixed to the shaft 48 and carry walking actuators 76 and 78 associated in pairs for rotating each container 26 with a step-by-step stop-and-go movement. Each actuator 76 and 78 is freely pivoted upon its respective eccentric 72 and 74 to enable the foot 80 to rest by gravity upon the surface of the container 26.

As shown, the feet 80 have toe portions 82 and heel portions 84 with the bottom of each foot being defined by an arcuate surface 86 which disposes the toe portions 82 slightly closer to the axis of the shaft 48 than the heel portions 84. With the eccentrics 72 and 74 shifted relative to each other upon the shaft 48, as shown in Fig. III, rotation of the shaft 48 clockwise will cause the eccentric 72 of the actuator 76 to be moved toward the container 26 with the point of contact progressing along the surface 86 from the heel portions 84 toward the toe portions 82. Movement toward the container 26 is accompanied by a clockwise swinging of the actuator 76 around the axis of the shaft 48 until the actuator 76 assumes the position of the actuator 78 shown in Fig. III. As the advancement of the eccentric 72 from that shown in Fig. III takes place the eccentric 74 is retarding to withdraw its actuator with its pivotal mounting on the eccentric permitting it to slide back into the position in which the actuator 76 is shown in Fig. III. This return movement of the surface 86 of the actuator 78 along the surface of the container 26 takes place while the latter is being rotated by the actuator 76 in the opposite direction.

The design and relative location of the surfaces 86 and the eccentrics 72 and 74 is such that there is a dwell, or substantially so, in the rotation of the container 26 taking place twice each rotation of the shaft 48. In other words, the walking action of the actuators 76 and 78 produces an intermittent rotation of the cylinder 26 in a clock-wise direction. This intermittent rotation enables the eggs within the containers 26, which are carried up on one side of the containers by the rotation, to slide and gently cascade or slide back in contact with each other during each period of dwell.

In Fig. V, the container 26 is shown with the cover 88 of Fig. VI removed and the bail 90 sprung into position on the trunnion 34. With this arrangement the container 26 may be conveniently employed to gather the eggs in the henhouse. To position the container 26 filled with eggs into one of the compartments 22 and 24, the cover 88 is positioned as shown in Fig. IV with the latch springs 91 carried by the heads 30 engaging in the openings 92 of the sheet metal side 94. With the washing liquid partly filling the compartment, the container 26 with the bail 90 attached is submerged to force the trunnions 34 down through the slot 96 and over into vertical alignment with the inverted bearings 44 where the buoyancy of the containers 26 hold the trunnions 34 in position. At the time the containers 26 are being placed in or removed from the compartments 22 and 24, the arms 76 and 78 may be conveniently swung back counter-clockwise out of the way by being rotated upon their respective eccentric.

As more clearly shown in Fig. VI, the cover 88 has slats 98 corresponding to the slats 28. To remove the cover 88, it is only necessary to lift up on the tabs 100, slightly spring the sides 94 to clear the latches 91.

In practice, the eggs are gathered in the containers 26 while in the form of Fig. V. Preferably the container 26 is of a size which when approximately three-quarters full will accommodate in the order of 120 to 180 eggs. After the eggs are gathered the bail 90 may be removed and the containers conveniently stacked in pyramid awaiting the washing operation.

After attaching the covers 88, the containers 26 may be located within the compartments 22 and 24 and supported by the bearings 44 with the liquid level in the compartments being indicated in the region of the level indicated at 102 in Fig. III. This level will be at approximately the level of the upper layer of eggs located within the containers and submerged in the washing liquid. The arms 76 and 78 are then swung about the shaft 48 to bring the surfaces 86 in contact with the slat 28. From Fig. III, it will be noted that the contact between the surface 86 and the slat 28 is above a straight line between the trunnion 34 and the shaft 48. With the eccentrics 72 and 74 secured in the shaft 48 at 180° apart, each rotation of the shaft 48 will result in two distinct upward thrusts being applied to the container 26. Each thrust, because of the shape of the concentrics 72 and 74, starts slowly then accelerates and then decelerates to a near stop effecting a gentle and cushioned motion. This stop and go motion thus produced causes the eggs in the container 26 to move up the side of the container and partially out of the washing liquid. Then, as the container 26 decelerates to a near stop the eggs cascade and slide to a position back into the washing liquid and toward the other side of the container to wash and clean the eggs by sliding them over each other.

After the eggs have been rotated several minutes and completely cleaned, the containers 26 are removed from the compartments 22 and 24, the covers 88 are removed and the eggs are poured onto the submerged rinsing and draining trays 104 having perforated bottoms. Following rinsing, the tray 104 is removed from the compartment 16 to drain and dry the eggs prior to candling, grading and packing.

To provide similar results with varying number of eggs being washed at different times in the containers 26, I have employed a compensating mechanism having the counter-balance 50. As will be readily appreciated, the liquid level in the compartments 22 and 24 will vary as the number of eggs in the containers vary. As the containers 26 and associated structure produce a buoyant assembly which actually floats in their respective compartments, as the number of eggs in the container increases the lower the container 26 will float until the foot portions 40 of the cradle 36 rest on the bottom 42, as shown in Fig. II. With less eggs in the containers 26, the containers being more buoyant, will tend to raise the cradle 36 toward some such position as shown in dotted line in Fig. II. I have found, however, that this is not sufficient to provide efficient operation and that the buoyancy of the entire assembly when the containers are loaded with the minimum number of eggs must be increased to keep the eggs in proper suspension. This has been accomplished by employing mechanism in combination with the counter-balance 50 designed to increase the effectiveness of the counter-balance 50 to off-set the increased weight of the parts emerging from the liquid as the containers 26 float higher in the liquid. As shown in Fig. VII the counter-balance arms 52 form part of a toggle joint thus being more effective as a counter-balance as the arms 52 swing counter-clockwise to extend the toggle joints.

As an important part of the present invention, I claim novelty in the improved method of washing and cleaning eggs by intermittent raising and then lowering the eggs in contact with each other from a position of complete submersion toward a position of partial submersion along a path which is comparable to that obtained by intermittent rotation of a cylinder around a horizontal axis within which the eggs are confined and submerged and in which the eggs engage with and are carried by the movement of the inner wall of the cylinder. With regard to this phase of the invention, it is to be appreciated that the means for agitating the eggs may take many forms. The liquid level may be maintained as shown in the drawings or by being confined solely within the agitating structure. Any structure which is capable of raising the eggs in the liquid with a gentle stop and go action toward a position of partial emersion from which the eggs by gravity cascade and slide in contact with each other to complete and then repeat the cycle of circulation of the eggs during the washing operation will realize to varying degrees the advantages of this phase of my invention.

I claim:

1. A method of washing eggs in the bulk comprising the steps of submerging eggs in a washing liquid while supporting the eggs in bulk in a generally semi-circular form below the surface of the liquid, rotating said form of bulk eggs in one direction only with a step-by-step stop and go movement about a substantially horizontal axis to raise a portion of the bulk eggs toward the liquid surface with first an accelerating and then a decelerating movement in a repeated cycle to cause the uppermost of the bulk eggs rising toward the liquid surface upon acceleration to cascade away from the liquid surface upon deceleration across the remaining bulk eggs and in the direction of rotation.

2. A method of washing eggs in the bulk comprising the steps of submerging the eggs in a washing liquid while supporting the eggs for rotation in the bulk about a substantially horizontal axis and imparting accelerating and decelerating rotational movement to the eggs in one direction only with a step-by-step stop and go movement, the form of the bulk upon rotation remaining substantially constant due to the uppermost eggs rising toward the liquid surface cascading away from the liquid surface across the egg bulk in the direction of rotation.

3. A method of washing eggs in the bulk comprising the steps of submerging the eggs in a washing liquid, supporting the eggs in a bulk of semi-cylindrical form and rotating the bulk of eggs below the surface of the liquid in one direction only with a step-by-step stop and go movement to cause the uppermost eggs of the bulk to cascade across the bulk in the direction of rotation.

References Cited in the file of this patent

UNITED STATES PATENTS

| | | |
|---|---|---|
| 696,088 | Straus | Mar. 25, 1902 |
| 1,128,981 | Hoffman | Feb. 16, 1915 |
| 2,100,675 | Traynor | Nov. 30, 1937 |
| 2,287,141 | Schofield | June 23, 1942 |
| 2,302,809 | Stehlik | Nov. 24, 1942 |
| 2,371,867 | Bayles | Mar. 20, 1945 |
| 2,374,500 | Reading | Apr. 24, 1945 |
| 2,399,926 | Hornberger | May 7, 1946 |
| 2,510,826 | Lillevick | June 6, 1950 |
| 2,520,889 | Paden | Aug. 29, 1950 |
| 2,576,236 | Paden | Nov. 27, 1951 |
| 2,620,603 | Holt | Dec. 9, 1952 |